United States Patent
Fujita (10) Patent No.: US 10,415,704 B2
(45) Date of Patent: Sep. 17, 2019

(54) PISTON RING

(71) Applicant: KABUSHIKI KAISHA RIKEN, Chiyoda-ku, Tokyo (JP)

(72) Inventor: Masaaki Fujita, Kashiwazaki (JP)

(73) Assignee: KABUSHIKI KAISHA RIKEN, Chiyoda-ku, Tokyo (JP)

( * ) Notice: Subject to any disclaimer, the term of this patent is extended or adjusted under 35 U.S.C. 154(b) by 0 days.

(21) Appl. No.: 15/546,648

(22) PCT Filed: Jan. 12, 2016

(86) PCT No.: PCT/JP2016/050656
§ 371 (c)(1),
(2) Date: Jul. 26, 2017

(87) PCT Pub. No.: WO2016/121483
PCT Pub. Date: Aug. 4, 2016

(65) Prior Publication Data
US 2018/0017159 A1    Jan. 18, 2018

(30) Foreign Application Priority Data

Jan. 29, 2015  (JP) .................. 2015-015066

(51) Int. Cl.
*F16J 9/20* (2006.01)
*F02F 5/00* (2006.01)
(Continued)

(52) U.S. Cl.
CPC .............. *F16J 9/206* (2013.01); *F02F 5/00* (2013.01); *F16J 9/20* (2013.01); *F16J 9/26* (2013.01); *F16J 9/14* (2013.01)

(58) Field of Classification Search
CPC ........ F16J 9/206; F16J 5/00; F16J 9/20; F16J 9/26; F16J 9/14; F16J 9/203; F16J 9/00; F16J 9/06; F16J 9/12
(Continued)

(56) References Cited

U.S. PATENT DOCUMENTS 1,614,602 A * 1/1927 Day ..................... F16J 9/20
                                                        277/461
2,459,395 A    1/1949 Smith
(Continued)

FOREIGN PATENT DOCUMENTS

CN       1473250       2/2004
CN     103403409     11/2013
(Continued)

OTHER PUBLICATIONS

International Preliminary Report on Patentability with Written Opinion dated Aug. 10, 2017 for PCT/JP2016/050656.
(Continued)

*Primary Examiner* — Nathan Cumar
(74) *Attorney, Agent, or Firm* — Soei Patent & Law Firm (57) ABSTRACT

A piston ring includes an annular main body 2 having a side surface 2a and a side surface 2b, and an inner peripheral surface 2c and an outer peripheral surface 2d, wherein in the main body 2, a cutout section 21 is provided in a corner section 31 formed by the side surface 2b and the outer peripheral surface 2d. The cutout section 21 has a first surface 21a and a second surface 21b. An angle θ1 formed by the first surface 21a and the side surface 2b is an obtuse angle, and a corner section 32 formed by the second surface 21b and the outer peripheral surface 2d is located between the side surface 2b and the side surface 2a in a width direction of the main body 2.

19 Claims, 7 Drawing Sheets (51) Int. Cl.
*F16J 9/26* (2006.01)
*F16J 9/14* (2006.01)

(58) Field of Classification Search
USPC .......................................................... 277/440
See application file for complete search history.

(56) References Cited

U.S. PATENT DOCUMENTS

| | | | |
|---|---|---|---|
| 2,511,874 A | 6/1950 | Phillips | |
| 2,940,803 A | 6/1960 | Phillips | |
| 3,095,204 A * | 6/1963 | Neely | F16J 9/22 |
| | | | 277/442 |
| 6,206,379 B1 * | 3/2001 | Toshiaki | F16J 9/203 |
| | | | 277/436 |
| 6,470,792 B1 | 10/2002 | Michel | |
| 7,207,571 B2 | 4/2007 | Yoshida et al. | |
| 7,429,048 B1 | 9/2008 | Carson | |
| 2002/0033579 A1 | 3/2002 | Ishida | |
| 2009/0226756 A1 * | 9/2009 | Ogawa | C22C 38/02 |
| | | | 428/684 |
| 2010/0066031 A1 | 3/2010 | Esser | |
| 2011/0309586 A1 | 12/2011 | Esser | |
| 2013/0154196 A1 * | 6/2013 | Sytsma | B23P 15/06 |
| | | | 277/434 |
| 2013/0328274 A1 | 12/2013 | Sugiura et al. | |
| 2015/0198249 A1 | 7/2015 | Watanabe | |

FOREIGN PATENT DOCUMENTS

| | | |
|---|---|---|
| DE | 10322032 | 1/2005 |
| DE | 102004021361 | 5/2005 |
| GB | 2164418 | 3/1986 |
| JP | S60-157956 | 10/1985 |
| JP | 2645116 | 8/1997 |
| JP | H10-252891 | 9/1998 |
| JP | 2002-323133 | 11/2002 |
| JP | 2011-169388 | 9/2011 |
| JP | 2015-503072 | 1/2015 |
| WO | 2012/118036 | 9/2012 |
| WO | 2013/090436 | 6/2013 |
| WO | 2014/024799 | 2/2014 |

OTHER PUBLICATIONS

Extended Search Report in corresponding European Application No. 16743087.5, dated Aug. 9, 2018.

* cited by examiner

PISTON RING

CROSS-REFERENCE TO RELATED APPLICATIONS

This application is a U.S. National Phase patent application of PCT Application No. PCT/JP2016/050656, filed Jan. 12, 2016, which claims the benefit of priority from Japanese Patent Application No. 2015-015066, filed Jan. 29, 2015.

TECHNICAL FIELD

The present invention relates to a piston ring used in an internal combustion engine or the like, and particularly to a piston ring disposed between a top ring and an oil ring.

BACKGROUND ART

A piston ring used in an internal combustion engine of a motor vehicle or the like is provided in, for example, a ring groove of a piston outer peripheral surface, and has a function of restraining oil on a cylinder inner wall from entering a combustion chamber side from a crank chamber side (oil-up), and restraining blowby gas from entering the crank chamber side from the combustion chamber side. Examples of the piston ring having such a function include a piston ring described in Patent Literature 1. This conventional piston ring is also called a second ring, and has a tapered section provided on an upper surface side in an outer peripheral surface, and a flat section parallel to the axial direction of a piston. A corner section formed by the tapered section and the flat section, and a corner section formed by the flat section and a lower side surface each have a rounded shape.

CITATION LIST

Patent Literature

Patent Literature 1: Japanese Unexamined Patent Publication No. 2011-169388

SUMMARY OF INVENTION

Technical Problem

The above second ring moves from a lower surface to an upper surface of the ring groove in accordance with inertia force of a ring in a compression stroke of the piston. By this movement of the second ring, the pressure of a space (second land) formed by a top ring, the second ring, the piston and the cylinder inner wall is lowered, and the top ring closely contacts the lower surface of the ring groove. Consequently, inhibitory action of oil-up and a blowby gas amount is exerted.

With recent improvement of engine performance, a second ring made of steel is used in place of a conventional second ring made of cast iron. When the inertial weight of the steel second ring is lowered by thinning of the width of the steel second ring, the conventional movement of the second ring from the lower surface to the upper surface of the ring groove in a compression stroke is not performed.

In a case where the second ring does not move from the lower surface to the upper surface of the ring groove as described above, the pressure of the second land is not sufficiently lowered, and the top ring does not closely contact the lower surface of the ring groove, so that there is a fear that a floating phenomenon (fluttering) of the top ring is caused. When the fluttering occurs, there is a possibility that a problem of increase in a blowby gas amount and of increase in an oil consumption amount due to backflow of gas and oil mist in the second land is caused.

An object of the present invention is to provide a piston ring capable of sufficiently restraining a blowby gas amount and an oil consumption amount by preventing fluttering of a top ring.

Solution to Problem

In order to solve the above problem, a piston ring according to an aspect of the present invention comprises an annular main body having an upper side surface and a lower side surface facing each other, and an inner peripheral surface and an outer peripheral surface facing each other, wherein in the main body, a cutout section is provided in a first corner section formed by the lower side surface and the outer peripheral surface, the cutout section has a first surface facing the outer peripheral surface side, and a second surface facing the lower side surface, an angle $\theta 1$ formed by the first surface and the lower side surface is an obtuse angle, and a second corner section formed by the second surface and the outer peripheral surface is located between the lower side surface and the upper side surface in a width direction of the main body.

In this piston ring, the cutout section is provided in the first corner section formed by the lower side surface and the outer peripheral surface of the main body. For example, in a compression stroke of a piston, oil scraped from a cylinder inner wall by the second corner section flows between the lower side surface and a lower surface of a ring groove through the cutout section. At this time, in this piston ring, the angle $\theta 1$ formed by the lower side surface and the first surface facing toward the outer peripheral surface in the cutout section is the obtuse angle, and therefore the oil is likely to flow between the lower side surface and the lower surface of the ring groove. Consequently, contact force between the lower side surface of the piston ring and the lower surface of the piston groove weakens to be likely to be separated, and therefore even when in the compression stroke of the piston, inertia force of the ring is lowered by thinning of the width, movement of the piston ring from the lower surface to the upper surface of the ring groove is likely to occur. Such a piston ring is used as, for example, a second ring between a top ring and an oil ring, so that the pressure of a space (second land) formed by the top ring, the second ring, the piston, and the cylinder inner wall is sufficiently lowered in the compression stroke of the piston, and it is possible to prevent fluttering of the top ring. Consequently, it is possible to sufficiently restrain a blowby gas amount and an oil consumption amount.

The piston ring may be a second ring. In this case, it is possible to sufficiently restrain a blowby gas amount and an oil consumption amount.

An angle $\theta 2$ formed by the first surface and the second surface may be an obtuse angle. In this case, oil flowing toward a space between the lower side surface and the lower surface of the ring groove is restrained from stagnating in the cutout section, and this oil is likely to flow between the lower side surface and the lower surface of the ring groove. Additionally, a tip of a jig for forming the cutout section has an obtuse angle, and machining of the cutout section is facilitated.

An angle $\theta 3$ formed by the first surface and a surface in the width direction, may be larger than an angle $\theta 4$ formed by the second surface and the lower side surface. In this case, flow of oil in the cutout section is unlikely to be hindered by the first surface, and this oil is likely to flow between the lower side surface and the lower surface of the ring groove. Additionally, a tip of a jig for forming the cutout section has an obtuse angle, and machining of the cutout section is facilitated.

A third corner section formed by the lower side surface and the first surface may have a rounded shape. In this case, oil flowing toward a space between the lower side surface and the lower surface of the ring groove is likely to flow, and movement of the second ring from the lower surface to the upper surface of the ring groove is likely to occur in the compression stroke of the piston.

A fourth corner section formed by the first surface and the second surface may have a rounded shape. In this case, flow of oil around the fourth corner section becomes satisfactory, and the movement of the second ring from the lower surface to the upper surface of the ring groove in accordance with the oil inertia is likely to occur.

The second corner section may have a rounded shape. In this case, it is possible to restrain cracking, chipping, and the like of the second corner section, and prevent damage of only a particular portion of the cylinder inner wall.

A hard film may be formed on the outer peripheral surface. In this case, the hard film can further secure wear resistance and scuffing resistance of the main body without hindering the flow of oil inside the cutout section.

Advantageous Effects of Invention

According to an aspect of the present invention, it is provided a piston ring capable of sufficiently restrain a blowby gas amount and an oil consumption amount by preventing fluttering of a top ring.

DESCRIPTION OF EMBODIMENTS

Hereinafter, preferred embodiment of the present invention will be described in detail with reference to the attached drawings. In the following description, the same components, or components having the same function are denoted by the same reference numerals, and overlapped description will be omitted.

Figure 1:
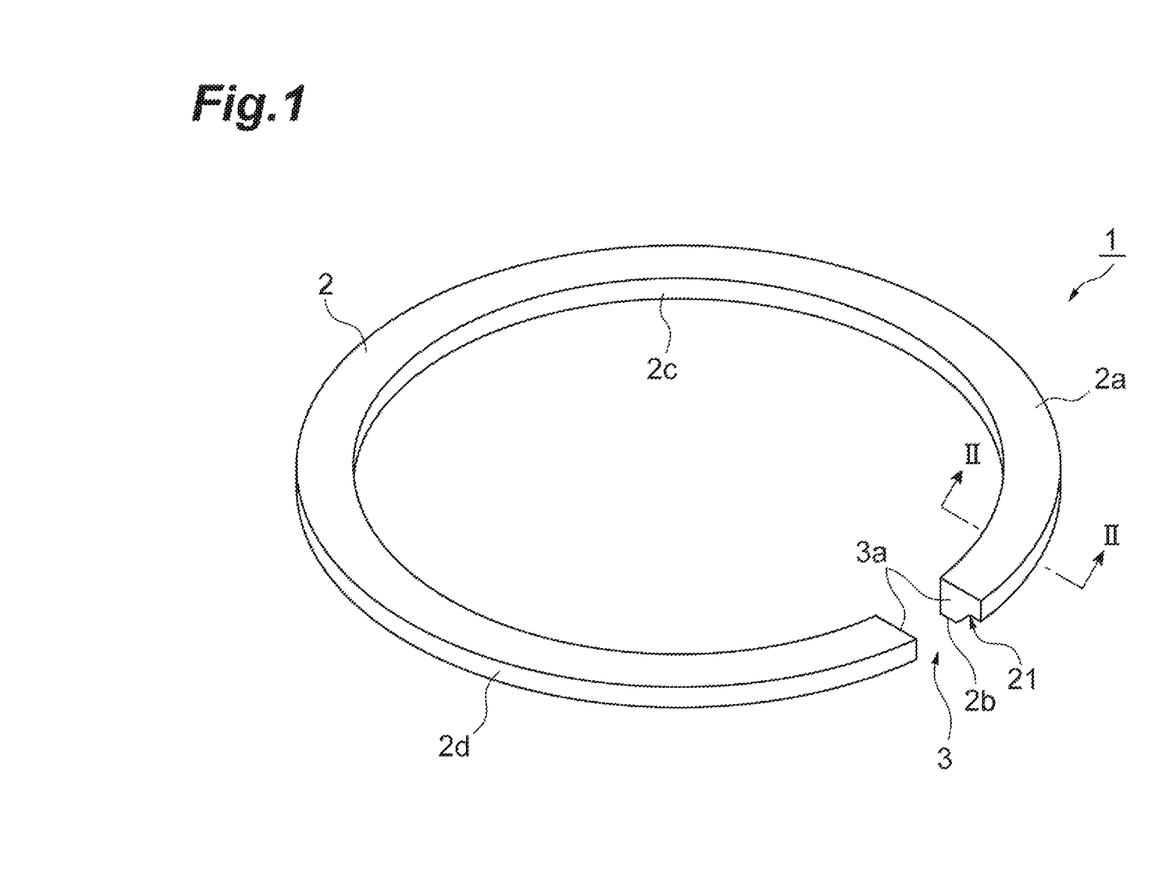
FIG. 1 is a perspective view of a second ring according to this embodiment of the present invention.

FIG. 1 is a perspective view of a piston ring according to this embodiment. The piston ring illustrated in FIG. 1 is used as a second ring provided in a ring groove on a piston outer peripheral surface in an internal combustion engine of a motor vehicle, for example. In this second ring 1, an outer peripheral surface 2d slides relative to a cylinder inner wall, so that the second ring 1 exhibits a function of restraining oil on the cylinder inner wall from entering a combustion chamber side from a crank chamber side (oil-up), and restraining blowby gas from entering the crank chamber side from the combustion chamber side.

The second ring 1 has an annular main body 2, and a joint 3 formed in a part of the main body 2. The main body 2 has a side surface (upper side surface) 2a and a side surface (lower side surface) 2b being end surfaces in the width direction and facing each other, and an inner peripheral surface 2c and an outer peripheral surface 2d being end surfaces in the thickness direction and facing each other. This main body 2 is formed in such a way as to have sufficient strength, heat resistance, and elasticity by using, for example, cast iron or steel containing a plurality of metallic elements. Additionally, a surface of the main body 2 may be subjected to surface modification by, for example, a hard chromium plating layer, a PVD layer, an iron nitride layer. Such a surface modified layer (surface treated film) is formed on at least the side surface 2b, so that it is possible to improve wear resistance of the main body 2 against the ring groove of the piston.

The joint 3 is a section formed by dividing a part of the main body 2. The joint 3 functions as a relief section for a thermal expansion portion of the main body 2 due to a temperature difference between the second ring 1 and the cylinder at the time of use of the second ring 1. This embodiment provides an example of straight joint in which gap faces 3a are each faulted at a right angle to the inner peripheral surface 2c and the outer peripheral surface 2d. However, the gap faces 3a may be obliqued joint formed by being inclined to the inner peripheral surface 2c and the outer peripheral surface 2d, or may be stepped joint formed in such a way that the side surface 2a of one of the gap face 3a and the side surface 2b of the other gap face protrude to the respective facing side surfaces.

Figure 2:
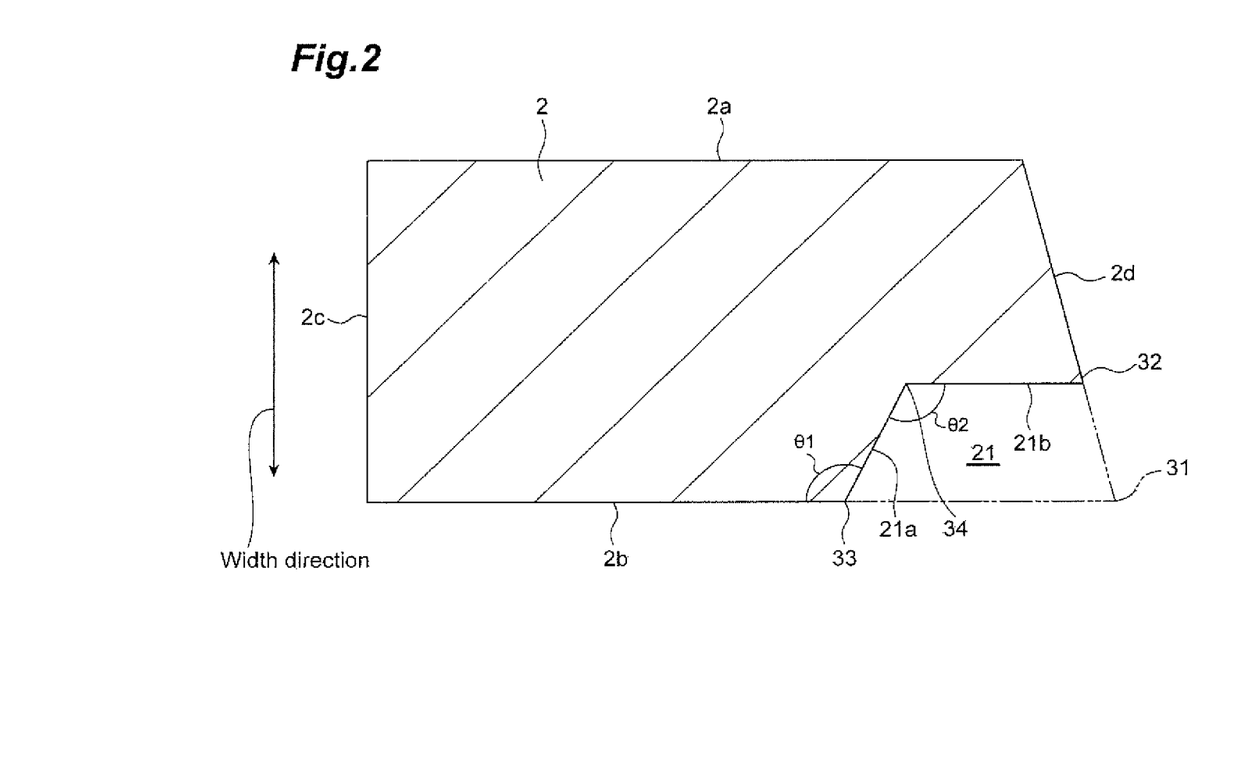
FIG. 2 is a II-II sectional view taken along the line of FIG. 1.

Now, the above main body 2 will be more specifically described. FIG. 2 is a II-II sectional view taken along the line of FIG. 1, and is a sectional view of the main body 2 along the radial direction of the second ring 1. As illustrated in FIG. 2, the outer peripheral surface 2d of the main body 2 has a shape inclined outward from the side surface 2a toward the side surface 2b (tapered shape). That is, the outer peripheral surface 2d inclines outward as the outer peripheral surface gets closer to the side surface 2b. The outer peripheral surface 2d has such a shape, so that when the outer peripheral surface 2d slides relative to the cylinder inner wall, oil on the cylinder inner wall can be satisfactorily scraped. The inner peripheral surface 2c of the main body 2 forms a substantially right angle to each of the side surface 2a and the side surface 2b. Each size and angle of the main body 2 can be measured by using a contact or noncontact (e.g., laser) shape measuring apparatus (including a surface roughness measuring apparatus).

As illustrated by a virtual line of FIG. 2, in the main body 2, a cutout section 21 is provided over a whole circumference of a corner section (first corner section) 31 formed by the side surface 2b and the outer peripheral surface 2d. That is, the cutout section 21 is provided in a part of the main body 2 on the side surface 2b side and the outer peripheral surface 2d side. The cutout section 21 is formed by cutting out the part of the main body 2 on the side surface 2b side and the outer peripheral surface 2d side over the whole circumference, for example, by a jig for cutting, for grinding, for polishing, or the like. Additionally, the above described part of the main body 2 is plastically machined by rolling, drawing, or the like, and a section becoming the cutout section 21 may be formed.

The cutout section 21 has a first surface 21a facing toward the outer peripheral surface 2d side, and a second surface 21b facing toward the side surface 2b. The first surface 21a is non-parallel to the outer peripheral surface 2d in a cross-section of the main body 2 along the radial direction. The first surface 21a inclines outward from the side surface 2b toward the second surface 21b. A corner section (third corner section) 33 formed by the first surface 21a and the side surface 2b is an obtuse angle. An angle θ1 is, for example, 90° to 135°.

The second surface 21b is substantially parallel to the side surface 2b in a cross-section of the main body 2 along the radial direction. The second surface 21b and the first surface 21a form a corner section (fourth corner section) 34 of an angle θ2 being an obtuse angle. For example, the angle θ2 is 90° to 135°. For example, in a case where a surface treated film is formed on the first surface 21a, the angle θ2 is equivalent to an angle from a surface of the surface treated film to the second surface 21b.

A corner section (second corner section) 32 formed by the second surface 21b and the outer peripheral surface 2d is located between the side surface 2a and the side surface 2b in the width direction of the main body 2. The corner section 32 is located on a central side in the width direction of the main body 2, and is located on the side surface 2b side.

Now, operational advantage of a case where the piston ring according to this embodiment is used as the second ring 1, and is actually mounted in a ring groove of a piston will be described.

Figure 3:
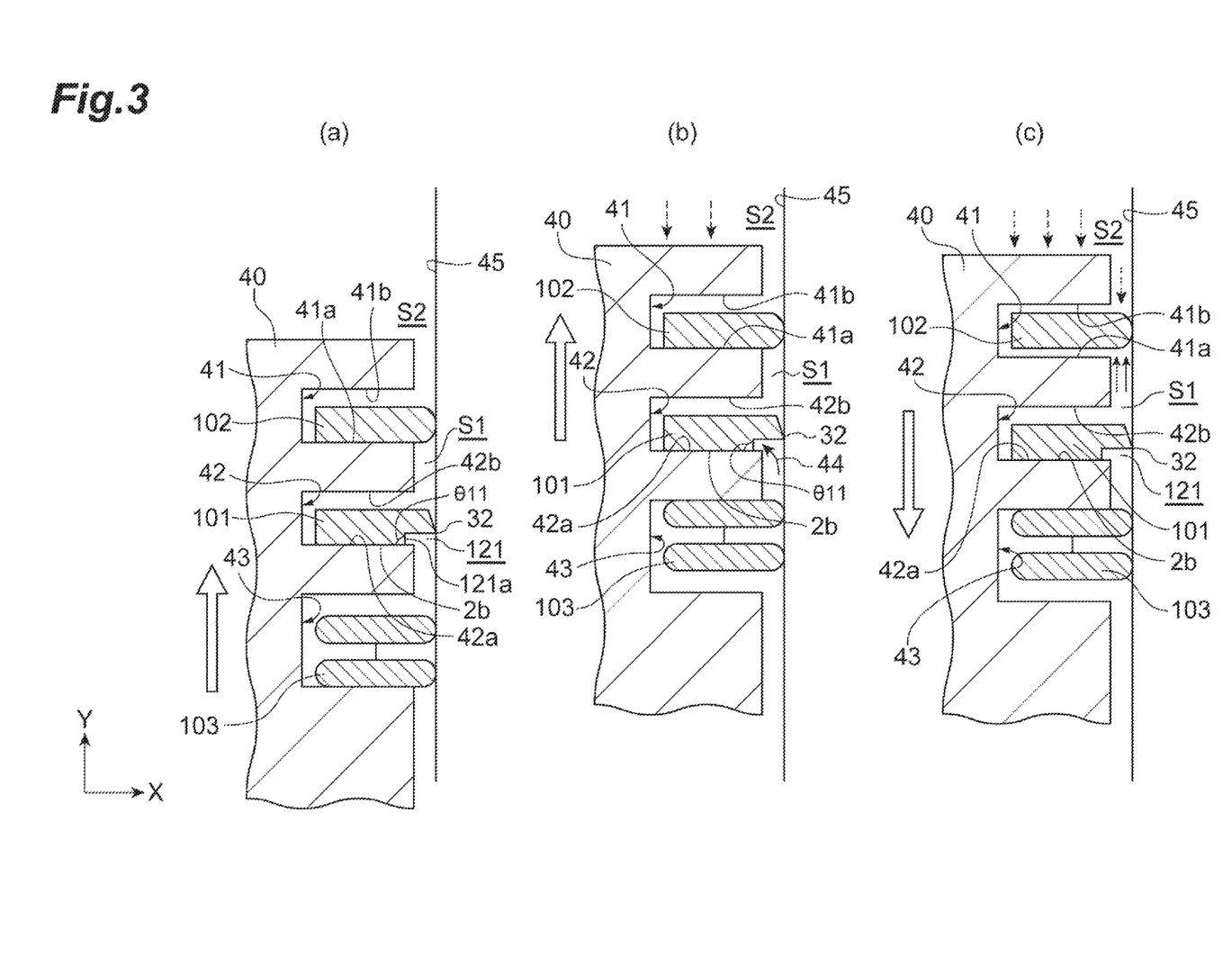
FIG. 3 is a schematic view illustrating an example of operation of a piston using a second ring according to a comparative example.

FIG. 3 is a schematic view illustrating an example of operation of a piston using a piston ring according to a comparative example. As illustrated in FIG. 3(a) to FIG. 3(c), a top ring 102, a second ring 101, and an oil ring 103 are mounted in respective ring grooves 41 to 43 provided on a piston 40 of a comparative example. The top ring 102, the second ring 101, and the oil ring 103 are each in slide contact with a cylinder inner wall 45. The second ring 101 of this comparative example has the same shape as the second ring 1 of this embodiment except that an angle θ11 formed by a side surface 2b and a first surface 121a of a cutout section 121 is a right angle or less.

In a case where such a second ring 101 is mounted in a ring groove 42, in a compression stroke of the piston 40 illustrated in FIGS. 3(a) to 3(c), oil on the cylinder inner wall 45 is scraped by a corner section 32, and the oil flows in the direction illustrated by an arrow 44 by inertia force. This oil is blocked by the first surface 121a of the cutout section 121, and is unlikely to flow between the side surface 2b and a lower surface 42a of the ring groove 42.

At this time, in the compression stroke of the piston, contact force between the side surface 2b of the second ring 101 and the lower surface 42a of the ring groove 42 is stronger than inertia force of the second ring 101, and therefore a phenomenon that the second ring does not move from the lower surface 42a to an upper surface 42b of the ring groove 42 sometimes occurs. In a case where this phenomenon occurs, the pressure of a space (second land) S1 formed by the top ring 102, the second ring 101, the piston 40, and the cylinder inner wall 45 rises with pressure rise of a combustion chamber S2 at a time of combustion, and the pressure of the space S1 is higher than the pressure of the combustion chamber S2 in the latter half of the compression stroke of the piston illustrated in FIG. 3(c). In a case where the width of the second ring 101 is thinned, and in a case where the second ring 101 is made of steel, the inertial weight of the second ring 101 is reduced, and therefore the above phenomenon is likely to particularly occur.

When the pressure of the space S1 is higher than the pressure of the combustion chamber S2 in the latter half of the compression stroke of the piston, the top ring 102 does not closely contact a lower surface 41a of the ring groove 41, and there is a fear that a floating phenomenon (fluttering) of the top ring 102 occurs. When the fluttering occurs, increase of a blowby gas amount, and increase of an oil consumption amount due to backflow of gas and oil mist in the space S1 are caused.

Figure 4:
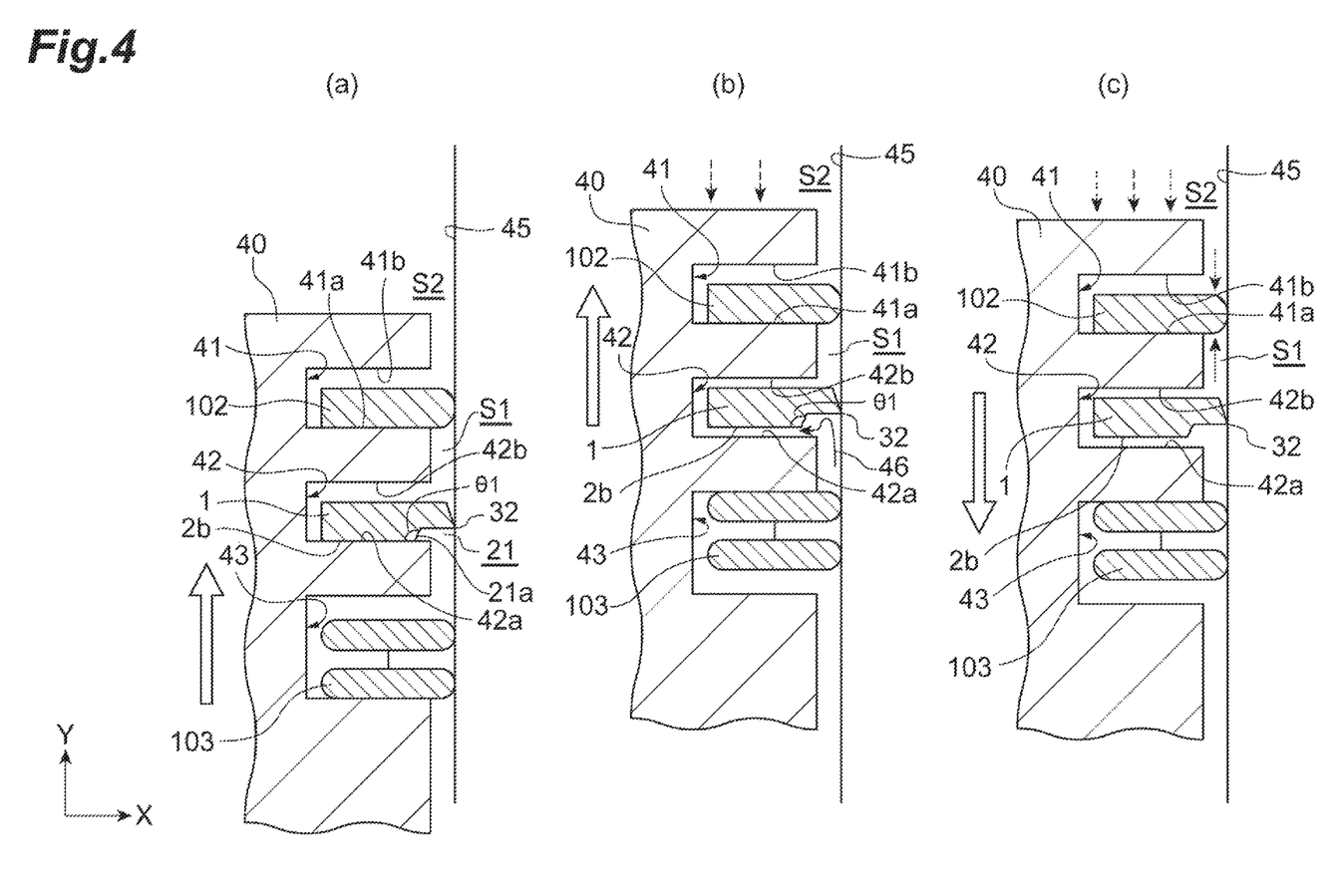
FIG. 4 is a schematic view illustrating an example of operation of a piston using the second ring according to this embodiment.

On the other hand, FIG. 4 is a schematic view illustrating an example of operation of a piston using the piston ring according to this embodiment. As illustrated in FIGS. 4(a) to 4(c), in the second ring 1, the angle θ1 formed by the side surface 2b, and the first surface 21a of the cutout section 21 is an obtuse angle. Consequently, in a compression stroke of the piston 40 illustrated in FIGS. 4(a) to 4(c), oil scraped from the cylinder inner wall 45 by the corner section 32 is likely to flow between the side surface 2b and the lower surface 42a of the ring groove 42 through the cutout section 21. In the compression stroke of piston 40, oil is introduced between the side surface 2b of the second ring 1 and the lower surface 42a of the ring groove 42 as illustrated by an arrow 46, so that contact force of the second ring 1 to the ring groove 42 is weakened. Consequently, movement of the second ring 1 from the lower surface 42a to the upper surface 42b of the ring groove 42 is likely to occur. By use of such a second ring 1, the pressure of the space S1 is sufficiently lowered in the compression stroke of piston 40, and it is possible to prevent the fluttering of the top ring 102. Accordingly, it is possible to sufficiently restrain the blowby gas amount and the oil consumption amount.

In the second ring 1, the angle θ2 formed by the first surface 21a and the second surface 21b is an obtuse angle. In this case, oil flowing toward a space between the side surface 2b and the lower surface 42a of the ring groove 42 is restrained from stagnating in the cutout section 21, and this oil is more likely to flow between the side surface 2b and the lower surface 42a of the ring groove 42. Additionally, a jig for forming the cutout section 21 can be easily prepared, and therefore machining of the cutout section 21 is facilitated.

Now, a modification of the above embodiment above will be described.

Figure 5:
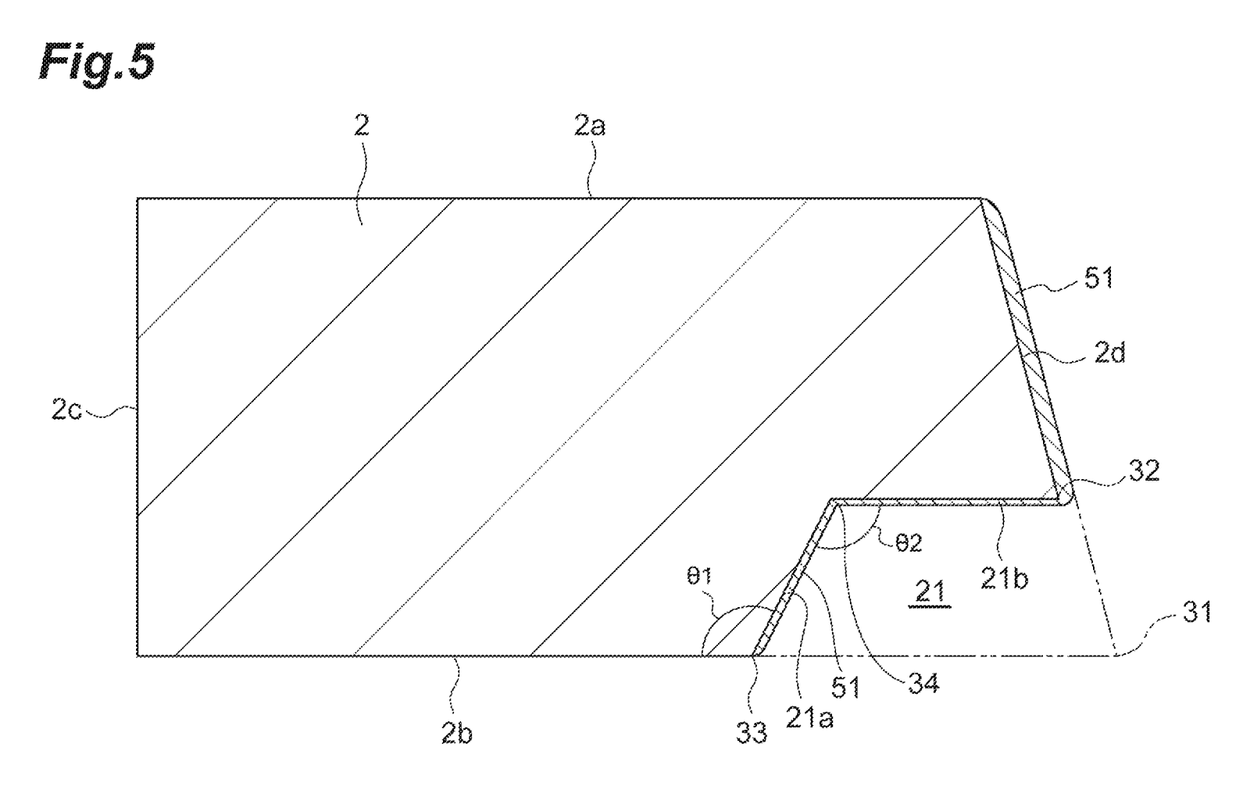
FIG. 5 is a sectional view of a main body of a second ring according to a modification of the present invention.

For example, while the second ring in which a protective film or the like is not formed on the surface of the main body 2 is illustrated in the above embodiment, a hard film 51 having higher hardness than the main body 2 may be formed on the outer peripheral surface 2d of the main body 2, and the first surface 21a and the second surface 21b of the cutout section 21, as illustrated in FIG. 5. This hard film 51 is provided on the outer peripheral surface 2d and the first surface 21a, so that wear resistance and scuffing resistance of the main body 2 can be further secured. The thickness of the hard film 51 is, for example, 0.5 μm to 40 μm. Therefore, for example, even in a case where the hard film 51 is provided on the first surface 21a, the hard film 51 does not hinder flow of oil in the cutout section 21. The thickness of the hard film 51 on the outer peripheral surface 2d is larger than the thickness of the hard film 51 on the first surface 21a.

The hard film 51 may be provided on at least one of the outer peripheral surface 2d and the first surface 21a, and may not be provided on the second surface 21b. Additionally, the hard film 51 may be provided on at least one of the side surfaces 2a, 2b, the inner peripheral surface 2c, and the second surface 21b in addition to at least one of the outer peripheral surface 2d and the first surface 21a. That is, the hard film may be provided at an arbitrary place of a surface of the main body 2 and a surface of the cutout section 21. The hard film 51 is formed on the surface of the main body 2, so that it is possible to further secure wear resistance and scuffing resistance of a predetermined surface of the main body 2. The thickness of the hard film 51 on the second surface 21b may be smaller than the thickness of the hard film 51 on the outer peripheral surface 2d, and the thickness of the hard film 51 on the first surface 21a, and may be the same as the thickness of the hard film on the first surface 21a.

As the hard film 51, for example, a film (PVD layer) formed by using a physical vapor deposition (PVD) method is applied. More specifically, the hard film 51 is an ion plating film formed by at least one of Ti and Cr, and at least one of C, N, O. Examples of such a film include a Ti—N film, a Ti—C—N film, a Cr—N film, a Cr—C—N film, and a Cr—O—N film. Among these, it is preferable to use the Cr—N film in a case where wear resistance and scuffing resistance are emphasized. Additionally, in order to improve adhesion between the main body 2 and the hard film 51, an undercoat such as a Cr film and a Ti film may be applied on the main body 2. In addition to the above, a DLC (diamond-like carbon) film may be used, or the DLC film may be coated on a CrN based ion plating film or a TiN based ion plating film in order to improve running-in.

Figure 6:
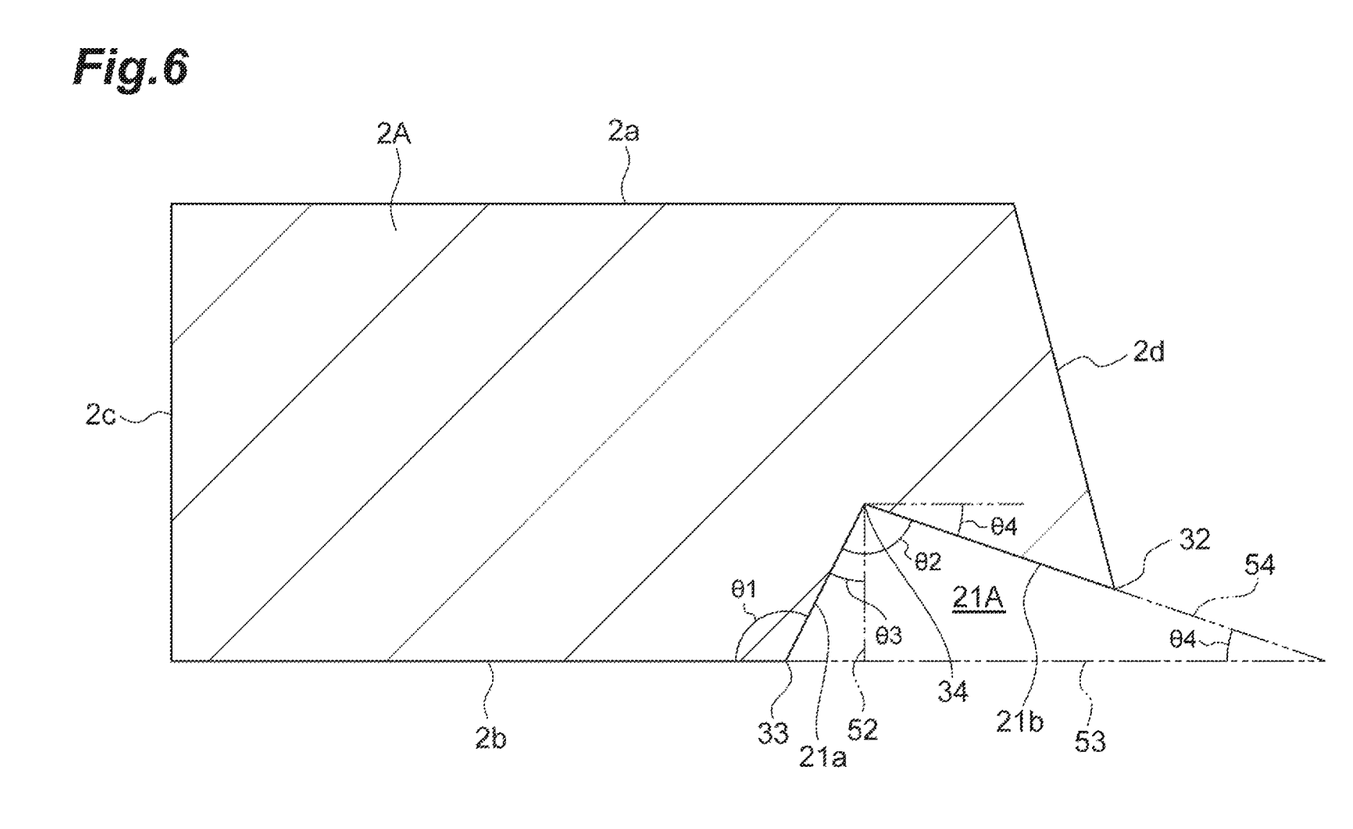
FIG. 6 is a sectional view of a main body of a second ring according to a modification of the present invention.

As illustrated in FIG. 6, a second surface 21b of a cutout section 21A is non-parallel to a side surface 2b of a main body 2A. In the main body 2A, an angle θ4 formed by the second surface 21b (more precisely, a surface 54 extending outward from the second surface 21b), and the side surface 2b (more precisely, a surface 53 extending outward from the side surface 2b side) is smaller than an angle θ3 formed by a first surface 21a and a surface 52 in the width direction. Consequently, in a similar manner to the main body 2 illustrated in FIG. 2, an angle θ2 is maintained in a range of an obtuse angle. In this case, flow of oil in the cutout section 21A is unlikely to be hindered by the first surface 21a, and this oil is likely to flow between the side surface 2b and the lower surface 42a of the ring groove 42 (refer to FIG. 4). Additionally, a jig for forming the cutout section 21A can be easily prepared, and therefore machining of the cutout section 21A is facilitated. The surface 52 in the width direction is a virtual surface extending along the width direction from an intersection of the first surface 21a and the second surface 21b in a cross-section of the main body 2A along the radial direction illustrated in FIG. 6. The angle θ4 is, for example, 0° to 30°.

In a case of the main body 2A illustrated in FIG. 6, a corner section 32 is located on the side surface 2b side with respect to a corner section 34 in the width direction of the main body 2A. Consequently, a protrusion amount of the corner section 32 in the thickness direction of the main body 2A is larger than a protrusion amount of the corner section 32 of the main body 2 illustrated in FIG. 1, and scraping performance of oil by the main body 2A is further improved.

Figure 7:
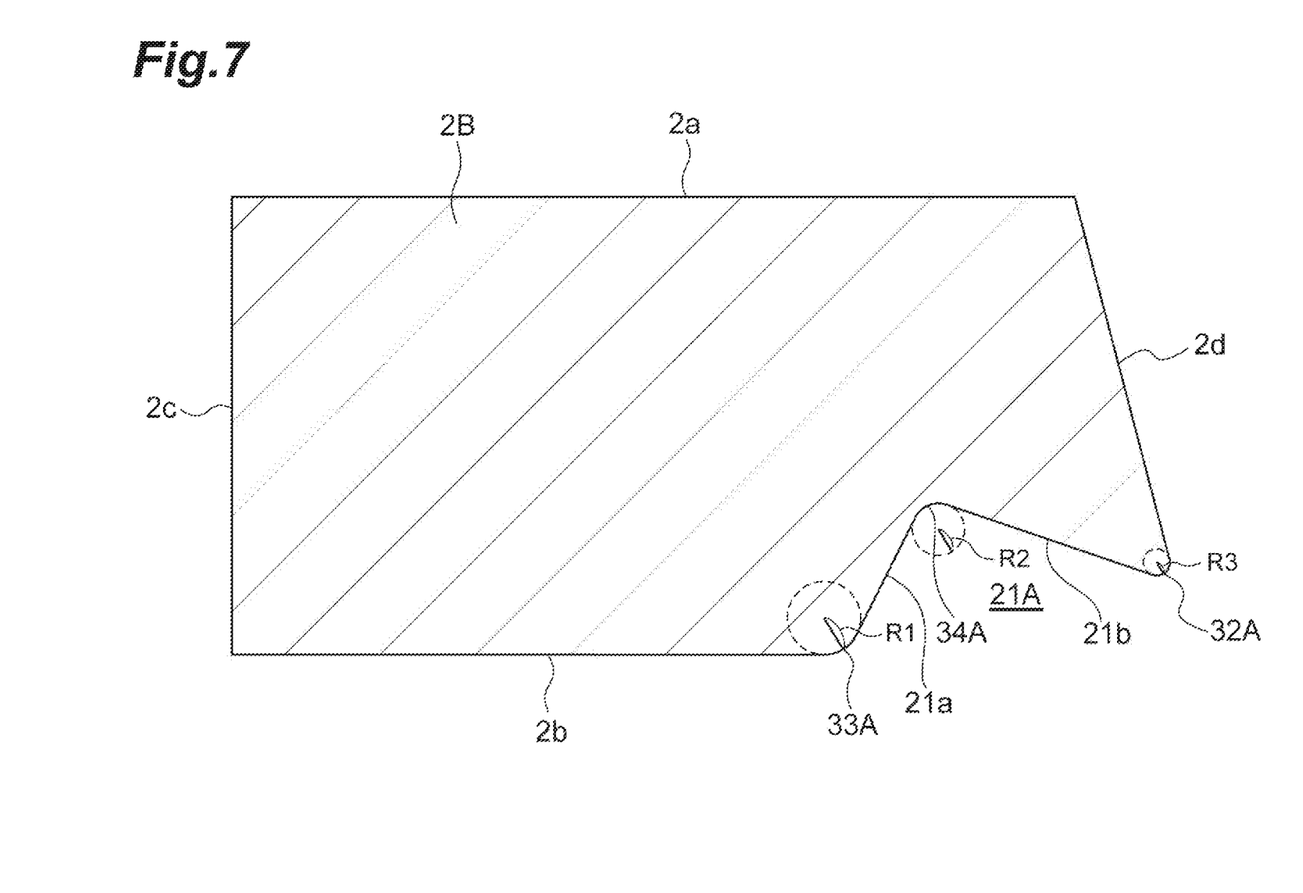
FIG. 7 is a sectional view of a main body of a second ring according to a modification of the present invention.

As illustrated in FIG. 7, corner sections 32A to 34A of a main body 2B may each have a rounded shape. In this case, in a cross-section of the main body 2B along the radial direction illustrated in FIG. 7, the radius of curvature R1 of the corner section 32A is, for example, 1 μm to 100 μm, the radius of curvature R2 of the corner section 33A is, for example, 100 μm to 500 μm, and the radius of curvature R3 of the corner section 34A is, for example, 100 μm to 500 μm.

The corner section 32A has the rounded shape, so that it is possible to restrain cracking, chipping, and the like of the corner section 32A, and prevent damage of only a particular section of the cylinder inner wall. The corner section 33A has the rounded shape, so that oil flowing toward a space between the side surface 2b and the lower surface 42a of the ring groove 42 (refer to FIG. 4) is likely to flow, and movement of the second ring 1 from the lower surface 42a to the upper surface 42b of the ring groove 42 in accordance with oil inertia reliably occurs. The corner section 34A has the rounded shape, so that the flow of oil around the corner section 34A becomes satisfactory, and movement of the second ring 1 from the lower surface 42a to the upper surface 42b of the ring groove 42 in accordance with oil inertia more reliably occurs.

The above respective components can be arbitrarily combined. For example, the hard film 51 illustrated in FIG. 5 may be provided on the surface of the main body 2A illustrated in FIG. 6, and the surface of the main body 2B illustrated in FIG. 7. Additionally, the corner sections 32 to 34 of the main body 2 illustrated in FIG. 1 may have rounded shapes.

The piston ring according to this embodiment can be used as, for example, a third ring in a diesel engine in addition to the second ring.

REFERENCE SIGNS LIST 1 second ring
2, 2A, 2B main body
2a, 2b side surface
2c inner peripheral surface
2d outer peripheral surface
21, 21A cutout section
21a first surface
21b second surface
31 to 34, 32A to 34A corner section
51 hard film
52 to 54 surface

The invention claimed is:
1. A piston ring comprising:
an annular main body including an upper side surface and a lower side surface, and an inner peripheral surface and an outer peripheral surface, wherein:
in the annular main body, a cutout section is provided in a first corner formed by the lower side surface and the outer peripheral surface;
the cutout section has a first surface, and a second surface;
an angle θ1 formed by the first surface and the lower side surface is an obtuse angle;
a second corner formed by the second surface and the outer peripheral surface is located at an elevated position relative to the lower side surface in a width direction of the annular main body, wherein the width direction extends from the lower side surface to the upper side surface; and
a width of the inner peripheral surface from the upper side surface to the lower side surface is greater than a width of the outer peripheral surface from the upper side surface to the second corner.
2. The piston ring according to claim 1, wherein the piston ring is a second ring.
3. The piston ring according to claim 1, wherein an angle θ2 formed by the first surface and the second surface is an obtuse angle.

4. The piston ring according to claim 1, wherein an angle θ3 formed by the first surface relative to the inner peripheral surface is larger than an angle θ4 formed by the second surface relative to the lower side surface.

5. The piston ring according to claim 1, wherein a third corner formed by the lower side surface and the first surface has a rounded shape.

6. The piston ring according to claim 1, wherein a fourth corner formed by the first surface and the second surface has a rounded shape.

7. The piston ring according to claim 1, wherein the second corner has a rounded shape.

8. The piston ring according to claim 1, wherein a film is formed on the outer peripheral surface.

9. The piston ring according to claim 8, wherein the film is formed by a physical vapor deposition method.

10. The piston ring according to claim 8, wherein the film is a film selected from the group consisting of a Ti—N film, a Ti—C—N film, a Cr—N film, a Cr—C—N film and a Cr—O—N film.

11. The piston ring according to claim 8, wherein the film is a diamond-like carbon film.

12. The piston ring according to claim 1, wherein the upper side surface is on an opposite side of the annular main body from the lower side surface.

13. The piston ring according to claim 1, wherein the inner peripheral surface is on an opposite side of the annular main body from the outer peripheral surface.

14. A piston ring comprising:
an annular main body including an upper side surface and a lower side surface, and an inner peripheral surface and an outer peripheral surface, wherein:
in the annular main body, a cutout section is provided in a first corner formed by the lower side surface and the outer peripheral surface;
the cutout section has a first surface, and a second surface, wherein the first surface faces toward the outer peripheral surface;
an angle θ1 formed by the first surface and the lower side surface is an obtuse angle; and
a second corner formed by the second surface and the outer peripheral surface is located at an elevated position relative to the lower side surface in a width direction of the annular main body, wherein the width direction extends from the lower side surface to the upper side surface.

15. The piston ring according to claim 1, wherein the second surface faces toward the lower side surface.

16. The piston ring according to claim 1, wherein the width direction of the annular main body is perpendicular to the lower side surface.

17. The piston ring according to claim 1, wherein the width direction of the annular main body is perpendicular to both the lower side surface and the upper side surface.

18. A piston ring comprising:
an annular main body including an upper side surface and a lower side surface, and an inner peripheral surface and an outer peripheral surface, wherein:
in the annular main body, a cutout section is provided in a first corner formed by the lower side surface and the outer peripheral surface;
the cutout section has a first surface, and a second surface, wherein the second surface is parallel to the lower side surface;
an angle θ1 formed by the first surface and the lower side surface is an obtuse angle; and
a second corner formed by the second surface and the outer peripheral surface is located at an elevated position relative to the lower side surface in a width direction of the annular main body, wherein the width direction extends from the lower side surface to the upper side surface.

19. The piston ring according to claim 18, wherein the outer peripheral surface is inclined with respect to the width direction.

* * * * *